United States Patent [19]

Yajima et al.

[11] 4,289,720
[45] Sep. 15, 1981

[54] PROCESS FOR PRODUCING A THERMAL-RESISTANT CERAMIC FIRED BODY

[75] Inventors: Seishi Yajima; Toetsu Shishido; Kiyohito Okamura; Hideo Kayano, all of Oharai; Josaburo Hayashi, Naga; Hiroshi Kobayashi, Fuji, all of Japan

[73] Assignee: The Foundation: The Research Institute for Special Inorganic Materials, Asahi, Japan

[21] Appl. No.: 117,603

[22] Filed: Mar. 3, 1980

Related U.S. Application Data

[63] Continuation of Ser. No. 930,079, Aug. 1, 1978, abandoned.

[30] Foreign Application Priority Data

Aug. 3, 1977 [JP] Japan .................................. 52-92584

[51] Int. Cl.³ ............................................ C05B 35/14
[52] U.S. Cl. ........................................ 264/63; 264/65; 264/137; 264/325; 501/87; 501/88; 501/97
[58] Field of Search ........................... 264/63, 65, 332; 264/137, 325; 106/43, 44

[56] References Cited

U.S. PATENT DOCUMENTS

| | | | |
|---|---|---|---|
| 4,117,057 | 9/1978 | Yajima et al. | 264/63 |
| 4,122,139 | 10/1978 | Yajima et al. | 264/63 |
| 4,158,687 | 6/1979 | Yajima | 264/65 |

Primary Examiner—John Parrish
Attorney, Agent, or Firm—Ladas & Parry

[57] ABSTRACT

A process for producing a thermal-resistant ceramic fired body is disclosed. As an additive for ceramic powder is used at least one specified organosilicon polymer selected from the group consisting of [I] organopolysiloxanes, [II] organosiloxane copolymers, [III] polycarbosiloxanes and [IV] nitrogen-containing organosilicon polymers.

5 Claims, 3 Drawing Figures

FIG. 2

PROCESS FOR PRODUCING A THERMAL-RESISTANT CERAMIC FIRED BODY

This is a continuation of application Ser. No. 930,079 filed Aug. 1, 1978.

This invention relates to a process for producing thermal-resistant ceramic fired bodies and more particularly, it relates to a process for producing thermal-resistant ceramic fired bodies by adding an organosilicon polymer as an additive to a thermal-resistant ceramic powder, molding the resulting mixture and heating the thus molded body under vacuum or in at least one atmosphere selected from inert gas, carbon monoxide gas, carbon dioxide gas, hydrogen gas, nitrogen gas and hydrocarbon gas.

Heretofore, there are known oxides such as $Al_2O_3$, BeO, MgO, $ZrO_2$, $SiO_2$ and the like; carbides such as SiC, TiC, WC, $B_4C$ and the like; nitrides such as $Si_3N_4$, BN, AlN and the like; borides such as $TiB_2$, $ZrB_2$ and the like; silicides such as $MoSi_2$, $WSi_2$, $CrSi_2$ and the like; and composite compounds thereof as a ceramic fired body having an excellent thermal resistance, which have widely been used. These ceramic fired bodies are produced by molding of respective starting powder and heat firing. Recently, it is considerably demanded to produce ceramic fired bodies having excellent high-temperature properties such as mechanical properties at high temperature and the like. For this purpose, it is most important to make an attempt for high densification of the product, so that many attempts have been reported with respect to various ceramics.

In order to obtain high density ceramic fired bodies, it is necessary to minimize a degree of porosity in grains and grain boundary of the fired body. For this end, molding under high pressure and heat firing at high temperature are proposed, but economical demerits are often accompanied in order to get the desired high pressure and high temperature. Therefore, there have been made various studies with respect to the production of high density fired bodies having less pore at relatively low pressure and low firing temperature by adding a proper additive as the process for producing high density fired bodies without using the high pressure and high temperature. According to this process, the use of the proper additive improves the sinterability of ceramic and at the same time restrains the abnormal growth of grains in the fired body, whereby pores are prevented to remain in the grains and the fired body is highly densified. That is, the process using the additive is advantageous in economy for the production of high density fired bodies.

As the usually used additive, mention may be made of MgO and NiO for the case of $Al_2O_3$; and CaO and $TiO_2$ for the case of $ZrO_2$; $Al_2O_3$, MgO and $Y_2O_3$ for the case of $Si_3N_4$; B, Si and C for the case of SiC; Ni and WC for the case of TiC; and $ZrO_2$ and $CrB_2$ for the case of $ZrB_2$. In any case, the oxide additive is mainly used, but a single element of metal or another carbide to the carbide, another boride to the boride may be used. The reason why these additives are selected is due to the fact that the firing of ceramic having poor sinterability is promoted, phase reaction is caused between the ceramic substrate and the additive, and the additive is plasticized or forms a liquid phase at high temperature to promote the firing.

However, the above mentioned additives have the following drawbacks. In the production of the high density fired body utilizing solid phase reaction between the additive and the ceramic substrate, different phases due to such reaction appear and are mainly existent in the grain boundary of the resulting crystal. However, these phases are apt to cause plastic deformation in the grain boundary at an elevated temperature, so that it is often difficult to produce ceramic fired bodies having an improved strength at high temperature. For instance, when MgO is added to $Si_3N_4$, a vitreous phase of $SiMgO_3$ is produced as a second phase, whereby high densification is achieved because this vitreous phase is existent in the grain boundary. However, the mechanical strength at high temperature of the resulting fired body rapidly decreases at a temperature of about 1,000° C. because the vitreous phase softens at that temperature. Furthermore, in the production of high density fired bodies utilizing the plasticization or liquefaction of the additive, there is also a drawback that the decrease of the strength becomes conspicuous owing to plastic deformation or liquid fluidization in the grain boundary at high temperature like the above case. As the additive not causing the decrease of the strength, ones other than the oxide forming vitreous phase and the single element of metal forming liquid phase are hopeful, but the use of such additives cannot be expected to give a sufficiently high densification because solid powders of carbides and borides are generally poor in the sinterability.

In order to eliminate the above mentioned drawbacks, there has been proposed a process wherein a siloxane polymer is used for the production of ceramic molding, for example, in U.S. Pat. No. 3,485,904. The siloxane polymer used in this process is a block polymer containing phenylmethylsiloxane and monomethylsiloxane or monophenylsiloxane, each content of which being not more than 10% and has a crosslinked structure. Furthermore, the molding and firing of the above process are carried out by the following steps:

(i) The siloxane block polymer is mixed with ceramic powder while fusing in a roll mill;
(ii) The resulting mixture is molded in a hot press;
(iii) The resulting shaped body is exposed to ammonia gas, whereby the siloxane polymer is crosslinked;
(iv) The shaped body is again pressed in the hot press of the step (ii); and
(v) The thus pressed body is heated at 500° to 1,550° C. to form ceramic bonding.

However, when the siloxane polymer disclosed in this patent is heated at an elevated temperature, terminal hydroxyl group of the polymer is first attacked to cause radical reaction, whereby the main chain of the polymer is cut, so that almost of the siloxane polymer evaporates and hence the firing residual ratio decreases. As a result, when the mixture of ceramic powder and siloxane polymer is heated at an elevated temperature, the density of the fired body lowers and the mechanical strength and thermal resistance thereof become poor.

The inventors have made various studies with respect to the process for producing ceramic fired bodies having excellent mechanical strength and thermal resistance at high temperature and as a result, it has been found that the mechanical strength, thermal resistance and the like of the ceramic fired body are considerably improved by using as an additive the following organosilicon polymers exhibiting a high firing residual ratio after heated at an elevated temperature.

[I] Organopolysiloxanes having the following structural formula:

In the above formula, $R_1$ and $R_2$ are the same or different and represent a hydrogen atom, an alkyl group having a carbon number of not more than 4, a haloalkyl group having a carbon number of not more than 4, a phenyl group, a cycloalkyl group having a carbon number of 5 to 8, a benzyl group or a vinyl group, $R_3$ represents a hydrogen atom, a trimethylsilyl group, a triphenylsilyl group, an acetyl group or an alkoxy group having a carbon number of not more than 4 and n is $3 \leq n < 10,000$.

[II] Organosiloxane copolymers having the following structural formula:

In the above formula, $R_1$ is a vinyl group, an allyl group, a haloalkyl group having a carbon number of not more than 4 or a hydrogen atom and $R_2$ is an alkyl group having a carbon number of not more than 4, a phenyl group or a cycloalkyl group having a carbon number of 5 to 8, k, l and m are $0 \leq k/l \leq 30$ and $0 \leq m/(k+l) \leq 0.5$, a, b and c are an integer of 3 to 6, respectively and n is less than 10,000.

[III] Polycarbosiloxanes having the following structural formula:

In the above formula, $R_1$ and $R_2$ are the same or different and represent an alkyl group having a carbon number of not more than 4, a haloalkyl group having a carbon number of not more than 4, a phenyl group, a cycloalkyl group having a carbon number of 5 to 8, a benzyl group or a vinyl group, $R_3$ represents (1) an alkenyl group having a carbon number of not more than 6 ($-(CH_2)_n-$, $n \leq 6$),
(2) a propylene group $$(-\overset{\overset{\displaystyle CH_3}{|}}{CH}-CH_2-),$$

(3) a vinylene group ($-CH=CH-$),
(4) a propenyl group ($-CH_2-CH=CH-$),
(5) a cyclopentylene group ($-C_5H_8-$),
(6) a cyclohexylene group ($-C_6H_{10}-$),
(7) a cyclohexenylene group ($-C_6H_8-$),
(8) an alkenedicarbonyl group $$(-\overset{\overset{\displaystyle O}{||}}{C}-(CH_2)_n-\overset{\overset{\displaystyle O}{||}}{C}-, \ n \leq 6),$$

(9) an maloyl group $$(-\overset{\overset{\displaystyle O}{||}}{C}-CH(OH)-CH_2-\overset{\overset{\displaystyle O}{||}}{C}-),$$

(10) a fumaroyl group $$(-\overset{\overset{\displaystyle O}{||}}{C}-CH=CH-\overset{\overset{\displaystyle O}{||}}{C}-(trans)),$$

(11) a maleoyl group $$(-\overset{\overset{\displaystyle O}{||}}{C}-CH=CH-\overset{\overset{\displaystyle O}{||}}{C}-(cis)),$$

(12) a phenylene group

(13) a naphthylene group

(14) an anthrylene group

(15) a phenylenecarbonyl group

(16) a phenylenedicarbonyl group

(17) a phenylsilylene group

(18) a 2-hydroxy trimethylene group

(19) a diphenylene group (20) an X-bis(4-phenyl-) group wherein X is a methylene group (—CH$_2$—), a 2,2-propylene group an epoxy group (—O—), a thio group (—S—), a sulfinyl group (—SO—) or a sulfonyl group (—SO$_2$—),

(21) a benzene-1,2,4,5-tetracarbonyl group

(22) a benzene-1,2(or 3), 5-tricarbonyl group (23) a benzene-1,3,5-free radical (24) a benzene-1,2,4,5-free radical or (25) an X-bis(3,5-phenylene-) group wherein X is an epoxy group (—O—), a methylene group (—CH$_2$—) or a thio group (—S—),
and R$_4$ represents a hydrogen atom, a trimethylsilyl group, a triphenylsilyl group, an acetyl group or an alkoxy group ($\leq$C$_4$) and n is less than 10,000.

[IV] Nitrogen-containing organosilicon polymers having the following structural formula:

In the above formula, R$_1$ and R$_2$ are the same or different and represent an alkyl group having a carbon number of not more than 4, a haloalkyl group having a carbon number of not more than 4, a phenyl group, a cycloalkyl group having a carbon number of 5 to 8, a benzyl group or a vinyl group, and R$_3$ represents a phenylenediamino group an alkenediamino group (—(NH)—CH$_2$)$_n$NH, n$\leq$6), a hydrazo group (—NH—NH—), a diphenylene-4,4'-diamino group or an X-bis(phenyl-4-amino) group wherein X is an epoxy group (—O—) or a methylene group (—CH$_2$—), and n is less than 10,000.

In brief, the invention lies in the use of the above defined organosilicon polymers as an additive in the production of thermal-resistant ceramic fired bodies. According to the invention, it is preferable that such organosilicon polymers is further subjected to at least one of the following treatments:

(1) The terminal of the polymer is hindered;
(2) A great number of phenyl groups are introduced into the polymer;
(3) The polymer is highly crosslinked by the introduction of functional groups;
(4) The polymer is highly crosslinked in the presence of a catalyst such as organic peroxides, metal halides and the like; and (5) The polymer is highly crosslinked by radical polymerization under irradiation of radiation.

The effects by the above treatments (1) to (5) will be described below.

Effect by the treatment (1)

When the terminal of the organosilicon polymer is hindered with trimethylsiloxane or triphenylsiloxane, the drawback as mentioned above, i.e. the occurrence of radical reaction is eliminated and the firing residual ratio increases considerably.

Effect by the treatment (2)

In the structural formula of the organosilicon polymer (II) as defined above are a great number of unit groups This diphenylsiloxane unit is symmetrical, easy in the production and cheaply available. The introduction of such unit group supplies an amount of carbon enough to reduce oxygen atoms and enhance the heat stability of the polymer as a whole, so that the high firing residual ratio is achieved. Similarly, the introduction of phenyl group is effective for the organosilicon polymers [I] and [III] as defined above.

Effect by the treatment (3)

When a functional group is introduced into the unit group in the structural formula of the organosilicon polymer [II] as defined above, the cross-linking of the polymer proceeds, so that the heat-stable polymer is obtained and also the firing residual ratio becomes high. However, if the above unit group increases too, the cross-linking is excessive and the resulting polymer is insoluble in a solvent, so that it is necessary to limit the correlation of m, k and l to $0 \leq m/(k+l) \leq 0.5$.

Effect by the treatment (4)

The use of organic peroxide catalyst mainly pulls out phenyl group and promotes radical reaction in the synthesis of the organosilicon polymer, whereby the highly crosslinked polymer with a long chain as a whole is obtained.

Similarly, the use of metal halide catalyst mainly pulls out hydrogen atom from methyl group and promotes radical reaction in the synthesis of the organosilicon polymer, whereby the highly crosslinked polymer with a long chain as a whole is obtained.

The use of such catalysts is applicable to the organosilicon polymers [I] to [III] as defined above and also the firing residual ratio of the resulting polymer is considerably high.

Effect by the treatment (5)

When radical polymerization is carried out under irradiation of radiation using, for example, γ-ray source of $Co^{60}$, the polymer is further crosslinked and the firing residual ratio is more increased.

Moreover, in the organosilicon polymer [II] as defined above, the repeating of unit group and unit group may be random or block. In this case, however, one unit of siloxane is considered to be $a = 3 \sim 6$, $b = 3 \sim 6$, so that the term "random" or "block" means the repeating of such unit groups.

The general production of the organosilicon polymers used in the invention will now be described below.

(1) In general, the siloxane polymer is produced by hydrolyzing organochlorosilane, e.g. dichlorodimethylsilane to form cycloorganosiloxane (e.g. hexamethylcyclotrisiloxane) and then heating at 150° to 400° C., preferably 200° to 300° C. in the presence of not more than few percentages of acid catalyst such as $H_2SO_4$, $H_3PO_4$ or base catalyst such as KOH to form a chainlike organopolysiloxane (e.g. polydimethylsiloxane). The siloxane copolymer can be obtained by polymerizing a mixture of organocyclosiloxanes in the same manner as described above.

(2) Polycarbosiloxanes are mainly produced by effecting dehydrochlorination of diorganodichlorosilane with an organic substance having two functional groups in a proper solvent.

In this case, the reaction temperature is dependent upon the kind of solvent used, but is within a range of 60° to 300° C., preferably 100° to 150° C. The addition of tertiary amine such as trimethylamine, pyridine and the like is effective for accelerating the dehydrochlorination. Further, when the functional group is carboxyl group, this group is converted into a salt and then may be reacted with the diorganodichlorosilane.

(3) The terminal hindering treatment is carried out by dissolving the polymer of the above item (1) or (2) in a solvent, adding methyl acetate, trimethylchlorosilane and triphenylsilane thereto and then heating.

In any case, the organosilicon polymer can be obtained in the form of viscous liquid or powder.

According to the invention, ceramic powder is added and mixed with the organosilicon polymer as an additive and then the resulting mixture is fired by heating at a temperature of 800° to 2,000° C., preferably 1,550° to 1,800° C. under vacuum or in at least one atmosphere selected from inert gas, hydrogen gas, carbon monoxide gas, carbon dioxide gas, nitrogen gas and hydrocarbon gas. In the firing, the organosilicon polymer produces Si and C each having high activity and vaporizable substance, which come into contact with the ceramic substrate, whereby the sinterability of ceramic is improved. Further, SiC and the like produced from Si and C act as a binder for closely adhering grains of the ceramic substrate with each other.

Figure 1A:
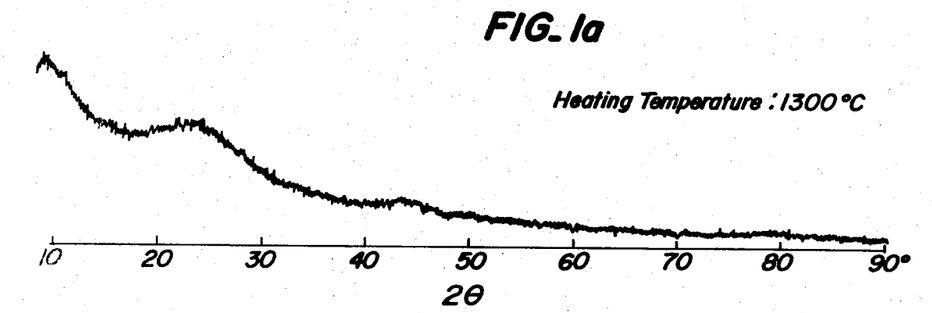
FIGS. 1a to 1c are X-ray diffraction patterns of phenoxydiphenylsiloxane polymer as an organosilicon polymer according to the invention when the polymer is heated at temperatures of 1,300° C., 1,500° C. and 1,700° C. in an argon gas atmosphere, respectively.
Figure 1B:
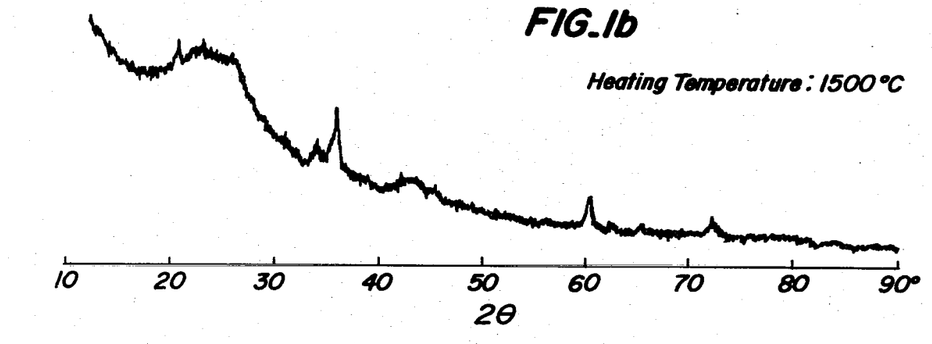
Figure 1C:
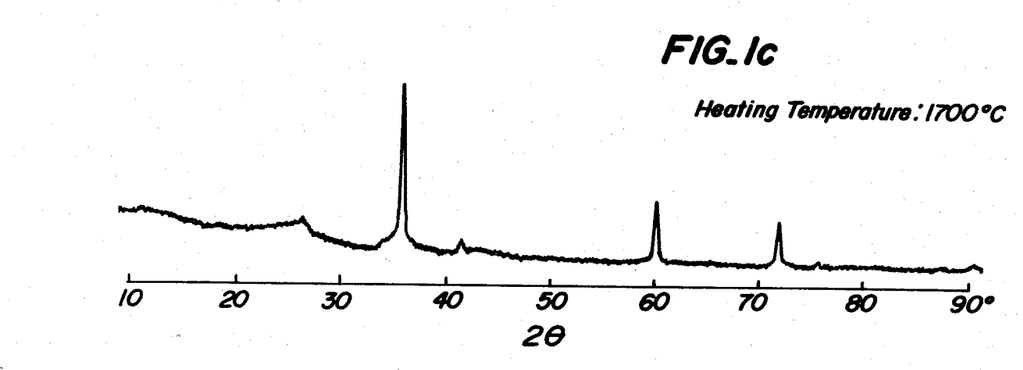

In FIGS. 1a–1c are shown X-ray diffraction patterns of phenoxydiphenylsiloxane polymer with a molecular weight of 3,000 having the following structural formula when it is heated at temperatures of 1,300°, 1,500° and 1,700° C. in an argon gas atmosphere. As seen from FIG. 1, the polymer is changed into a substantially amorphous β-SiC at the heating of 1,500° C. and a completely crystal β-SiC at the heating of 1,700° C. Therefore, in order to obtain ceramic fired bodies having an excellent oxidation resistance, it is desirable to heat a green body at a temperature of 1,550° to 1,800° C., whereby an organosilicon polymer as a binder is converted into a heat-stable ceramic.

Figure 2:
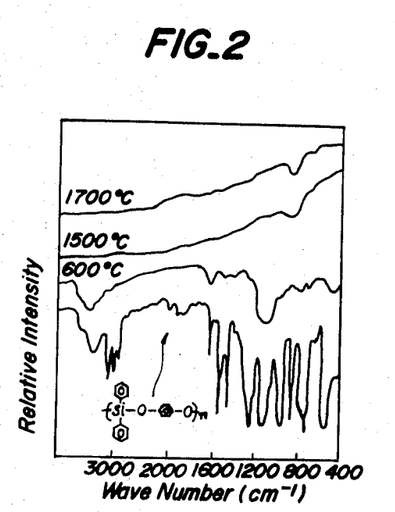
FIG. 2 is infrared absorption curves of phenoxydiphenylsiloxane polymer at various heating temperatures.

In FIG. 2 are shown infrared absorption curves of phenoxydiphenylsiloxane polymer when it is heated at temperatures of 600° C., 1,500° C. and 1,700° C. As seen from FIG. 2, the peak of Si-C bonding becomes sharp at the heating of 1,700° C.

Figure 3:
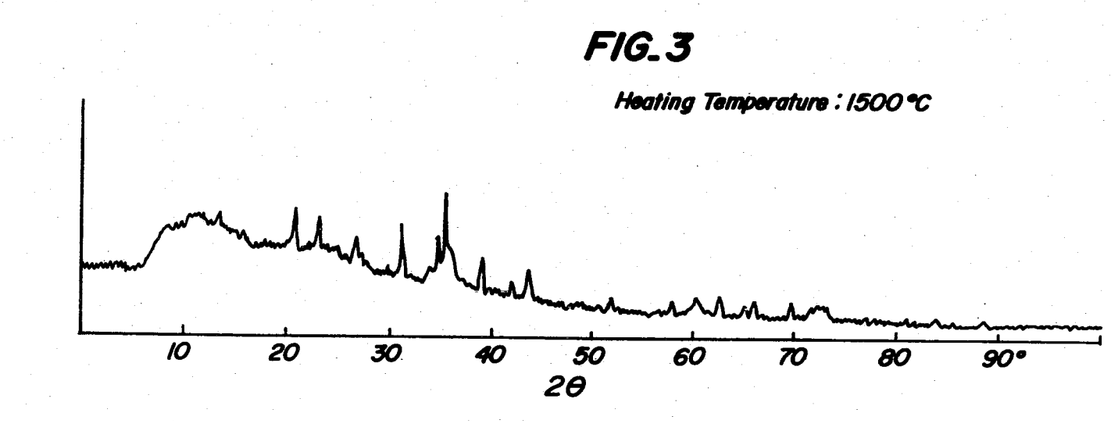
FIG. 3 is an X-ray diffraction pattern of phenoxydiphenylsiloxane polymer when the polymer is heated at 1,500° C. in a nitrogen gas atmosphere.

When the organosilicon polymer used in the invention is particularly fired in a nitrogen gas atmosphere, $Si_3N_4$ and SiC are mainly produced, which act to adhere the grains of the ceramic with each other. From X-ray diffraction pattern shown in FIG. 3, it can be seen that $Si_3N_4$ and SiC are produced when phenoxydiphenylsiloxane polymer is heated at 1,500° C. in a nitrogen gas atmosphere.

According to the invention, the amount of the organosilicon polymer added to the ceramic powder is dependent upon the firing under pressure as mentioned below, but such an addition amount is usually with a range of 0.05 to 20% by weight. When the amount is less than 0.05%, it is very difficult to obtain a high strength fired body, while when the amount exceeds 20%, the swelling is partly caused in the fired body and the strength is deteriorated.

Next, the process for producing the ceramic fired body is broadly divided into two processes, i.e. a first process comprising a step of molding a mixture of ceramic powder and organosilicon polymer and a step of firing the molded body under heating, and a second process of simultaneously molding and firing the mixture which is called as a hot press process. These two processes are adoptable to the invention. In the former process, the mixture of ceramic powder and the additive (i.e. organosilicon polymer) is first pressed under a pressure of 100 to 5,000 kg/cm² by a die press method, a rubber press method, an extrusion method or a sheet forming method to form a molded body of a given shape. Then, the molded body is fired to obtain a ceramic fired body. In the latter process, the mixture of ceramic powder and additive is pressed and heated under a pressure of 2 to 2,000 kg/cm² by means of a die composed of graphite, alumina or boron nitride which is so selected as not to react with the ceramic substrate to be used.

Moreover, the strength of the fired body can be further increased by subjecting at least one time to such a treatment that the ceramic fired body is impregnated with a liquid organosilicon polymer or a solution of a solid organosilicon polymer in a solvent or a melt of the solid organosilicon polymer by heating and then heated at a temperature of 800° to 2,000° C. under vacuum or in at least one atmosphere selected from inert gas, hydrogen gas, carbon monoxide gas, carbon dioxide gas, nitrogen gas and hydrocarbon gas after the impregnation degree is increased, if necessary, by pressing. In this case, benzene, toluene, xylene, hexane, ether, tetrahydrofuran, dioxane, chloroform, methylene chloride, petroleum ether, petroleum benzine, ligroin, furon, DMSO, DMF or the like is used in a small amount as a solvent for dissolving the organosilicon polymer or reducing its viscosity.

Typical examples of single compound as thermal-resistant ceramics applicable to the invention are shown in the following Table 1. According to the invention, single compounds having a composition ratio different from that of the compound shown in Table 1; composite compounds of these single compounds such as $MgAl_2C_4$, $LaCrO_3$, $B_4C$-$TiB_2$ and the like; ceramics having a non-stoichiometric composition such as $TiO_{1\pm x}$ and the like; silicates; glass; and ceramics having a trace amount of metal phase may also be used. Further, as the ceramic powder may be used ones obtained by mixing at least one ceramic selected from oxides; carbides, nitrides, borides and silicides with the organosilicon polymer, calcining the resulting mixture under vacuum or in at least one atmosphere selected from inert gas, CO gas, $CO_2$ gas, nitrogen gas and hydrocarbon gas and then pulverizing the calcined mixture or ones obtained by calcining the organosilicon polymer under vacuum or in at least one atmosphere selected from inert gas, CO gas, $CO_2$ gas, nitrogen gas and hydrocarbon gas and then pulverizing the calcined polymer.

TABLE 1(a)

| Oxides | Melting point (°C.) | Density (g/cm³) | Carbides | Melting point (°C.) | Density (g/cm³) | Nitrides | Melting point (°C.) | Density (g/cm³) | Borides | Melting point (°C.) | Density (g/cm³) | Silicides | Melting point (°C.) | Density (g/cm³) |
|---|---|---|---|---|---|---|---|---|---|---|---|---|---|---|
| BeO | 2,550 | 3.03 | $Be_2C$ | 2,150 | 2.44 | $Be_3N_2$ | 2,240 | — | | | | | | |
| — | — | — | $B_4C$ | 2,450 | 2.52 | BN | 3,000 | 2.34 | — | — | — | — | — | — |

TABLE 1(a)-continued

| Oxides | Melting point (°C.) | Density (g/cm³) | Carbides | Melting point (°C.) | Density (g/cm³) | Nitrides | Melting point (°C.) | Density (g/cm³) | Borides | Melting point (°C.) | Density (g/cm³) | Silicides | Melting point (°C.) | Density (g/cm³) |
|---|---|---|---|---|---|---|---|---|---|---|---|---|---|---|
| MgO | 2,800 | 3.58 | | | | $Mg_3N_2$ | 1,027 | — | | | | | | |
| $Al_2O_3$ | 2,015 | 3.97 | $Al_4C_3$ | 2,800 | 2.99 | AlN | 2,450 | 3.26 | $AlB_4$ | 1,100 | | | | |
| $SiO_2$ | 1,723 | 2.32 | SiC | 2,400 | 3.21 | $Si_3N_4$ | 1,920 | 3.18 | | | | — | — | — |
| CaO | 2,600 | 3.32 | $CaC_2$ | 2,300 | 2.04 | $Ca_3N_2$ | | | $CaB_6$ | >2,100 | 2.33 | CaSi | 1,245 | — |
| $Sc_2O_3$ | 2,300 | 3.89 | | | | ScN | 2,650 | 4.21 | | | | | | |
| $TiO_2$ | 1,840 | 4.24 | TiC | 3,140 | 4.25 | TiN | 2,950 | 5.21 | $TiB_2$ | 2,600 | 4.52 | $Ti_5Si_3$ | 2,120 | 4.32 |
| $V_2O_3$ | 1,977 | 4.87 | VC | 2,830 | 6.70 | VN | 2,030 | 6.04 | $VB_2$ | 2,400 | 5.01 | $V_5Si_3$ | — | 5.30 |
| $Cr_2O_3$ | 2,265 | 5.21 | $Cr_3C_2$ | 1,895 | 6.70 | CrN | 1,493 | 6.1 | $CrB_2$ | 1,900 | 5.20 | $CrSi_2$ | 1,550 | 5.0 |
| MnO | 1,780 | 5.40 | $Mn_3C$ | 1,520 | 6.89 | $Mn_3N_2$ | >1,100 | — | MnB | — | 6.2 | | | |
| $Fe_2O_3$ | 1,560 | 5.12 | $Fe_3C$ | 1,650 | 7.67 | | | | FeB | 1,550 | 7.15 | FeSi | 1,400 | — |
| CoO | 1,805 | 6.46 | | | | | | | CoB | — | 7.25 | CoSi | 1,460 | — |
| NiO | 1,950 | 6.8 | | | | | | | NiB | 1,020 | 7.39 | | | |

TABLE 1(b)

| Oxides | Melting point (°C.) | Density (g/cm³) | Carbides | Melting point (°C.) | Density (g/cm³) | Nitrides | Melting point (°C.) | Density (g/cm³) | Borides | Melting point (°C.) | Density (g/cm³) | Silicides | Melting point (°C.) | Density (g/cm³) |
|---|---|---|---|---|---|---|---|---|---|---|---|---|---|---|
| CuO | 1,026 | 6.40 | | | | | | | | | | | | |
| ZnO | 1,975 | 5.66 | | | | | | | | | | | | |
| SrO | 2,415 | 4.7 | $SrC_2$ | 1,927 | 3.04 | $Sr_3N_2$ | 1,027 | — | $SrB_6$ | >2,100 | 3.3 | | | |
| $Y_2O_3$ | 2,410 | 4.84 | $YC_2$ | 2,210 | — | | | | $YB_6$ | — | 3.75 | | | |
| $ZrO_2$ | 2,677 | 5.56 | ZrC | 3,530 | 6.70 | ZrN | 2,980 | 6.93 | $ZrB_2$ | 3,000 | 6.17 | $ZrSi_2$ | 1,520 | 4.9 |
| $Nb_2O_3$ | 1,510 | 4.47 | NbC | 3,500 | 7.82 | NbN | 2,030 | 8.4 | $NbB_2$ | 3,050 | 6.95 | $NbSi_2$ | 1,950 | 5.29 |
| | | | $Mo_2C$ | 2,687 | 8.9 | $Mo_3N_2$ | — | — | $MoB_2$ | 2,100 | 5.1 | $MoSi_2$ | 2,030 | 6.12 |
| BaO | 1,923 | 5.72 | $BaC_2$ | 1,780 | 3.81 | | | | $BaB_6$ | >2,100 | 4.36 | | | |
| $La_2O_3$ | 2,305 | 6.51 | $LaC_2$ | 2,360 | — | | | | $LaB_6$ | >2,100 | — | | | |
| $CeO_2$ | >2,600 | 7.13 | $CeC_2$ | 2,290 | — | | | | $CeB_6$ | >2,100 | — | | | |
| $Pr_6O_{11}$ | 2,200 | 7.07 | $PrC_2$ | 2,160 | — | | | | $PrB_6$ | — | — | | | |
| $Nd_2O_3$ | 2,270 | 7.24 | $NdC_2$ | 2,260 | — | NdN | 1,024 | 7.69 | $NdB_6$ | — | — | | | |
| $Sm_2O_3$ | 2,350 | 7.0 | $SmC_2$ | — | — | | | | $SmB_6$ | — | 5.07 | | | |
| $Eu_2O_3$ | 2,050 | 7.42 | | | | | | | $EuB_6$ | — | 4.95 | | | |

TABLE 1(c)

| Oxides | Melting point (°C.) | Density (g/cm³) | Carbides | Melting point (°C.) | Density (g/cm³) | Nitrides | Melting point (°C.) | Density (g/cm³) | Borides | Melting point (°C.) | Density (g/cm³) | Silicides | Melting point (°C.) | Density (g/cm³) |
|---|---|---|---|---|---|---|---|---|---|---|---|---|---|---|
| $Gd_2O_3$ | 2,350 | 7.04 | $GdC_2$ | 2,260 | — | | | | $GdB_6$ | — | — | | | |
| $Tb_2O_3$ | — | 7.81 | $TbC_2$ | 2,100 | — | | | | $TbB_6$ | — | — | | | |
| $Dy_4O_7$ | 2,340 | 8.2 | $DyC_2$ | 2,250 | — | | | | $DyB_6$ | — | 5.35 | | | |
| $Ho_2O_3$ | — | 8.36 | | | | | | | $HoB_6$ | — | — | | | |
| $Er_2O_3$ | — | 8.65 | $ErC_2$ | 2,280 | — | | | | $ErB_6$ | — | — | | | |
| $Tm_2O_3$ | — | 8.77 | $TmC_2$ | 2,180 | — | | | | $TmB_6$ | — | — | | | |
| $Yb_2O_3$ | 2,346 | 9.28 | | | | | | | $YbB_6$ | — | — | | | |
| $Lu_2O_3$ | 2,320 | 9.42 | | | | | | | $LuB_6$ | — | — | | | |
| $HfO_2$ | 2,777 | 9.68 | HfC | 3,887 | 12.20 | HfN | 3,307 | 14.0 | $HfB_2$ | 3,250 | 11.19 | | | |
| $Ta_2O_5$ | 1,890 | 8.02 | TaC | 3,877 | 14.48 | TaN | 2,980 | 14.1 | $TaB_2$ | 3,200 | 12.56 | $TaSi_2$ | 2,200 | 8.4 |
| $WO_3$ | >2,130 | 7.16 | WC | 2,867 | 15.50 | $WN_2$ | >2,100 | — | WB | 2,860 | 16.0 | $WSi_2$ | 2,180 | 9.8 |
| $ThO_2$ | 3,300 | 9.69 | ThC | 2,625 | 10.65 | ThN | 2,360 | 11.5 | $ThB_6$ | >2,100 | 6.4 | | | |
| $UO_2$ | 2,280 | 10.96 | UC | 2,250 | 13.63 | UN | 2,630 | 14.32 | $UB_4$ | — | 9.32 | | | |

According to the invention, the ceramic molded body is immersed in a solution of monomethyl- and/or monophenyl-trichlorosilane, exposed to wet ammonia gas and then dried prior to the heat firing of the ceramic molded body. Alternatively, the ceramic molded body is exposed to an irradiation of γ-ray. Moreover, at least one substance selected from organic peroxides, chlorides and bromides of Al, Fe, B, Ga and In may be added to the organosilicon polymer.

The thermal-resistant ceramic fired bodies obtained according to the invention are utilized for applications requiring the thermal resistance and as a material for absorbing a neutron in case of, for example, $B_4C$, $TiB_2$ and $ZrB_2$ bodies and may be used as the following materials:

(1) Building materials panel, doom, trailer house, wall, roofing material, flooring material, cooling tower, purifying tank, sewage tank, feed tank, hotwater supply pipe, drain pipe, heat pipe for heat exchange and the like;

(2) Materials for airplane and space developing apparatus: fuselage, wings, drive shaft for helicopter, compressor for jet engine, rotor, stator, blade, compressor casing, housing, nose cone, rocket nozzle, braking material, tire cord and the like;

(3) Materials for shipping: boat, yacht, fishing boat, working ship and the like;

(4) Materials for road vehicles: front part of cars, side plate, water tank, lavatory unit, seat, car body, container, road machine, guard rail, pallet, tank for tank lorry, bicycle, auto-bicycle and the like;

(5) Materials for corrosion-resistant apparatus: tanks, ducts for tower, staffs, pipes and the like;

(6) Electrical materials: panel heating unit, varistor, ignitor, thermocouple and the like;

(7) Sports goods: boat, western-style bow, skis, snow mobile, water skis, glider body, tennis racket, golf shaft, helmet, bat, racing jacket and the like;

(8) Machinery elements: gasket, packing, gear braking material, friction material, abrasives and the like;

(9) Materials for medical machine: artificial leg, artificial arm and the like; and (10) Materials for audio apparatus: canti lever, tone arm, speaker cone, voice coil and the like.

For a better understanding of the invention, reference is made to the accompanying drawings, wherein.

The following examples are given in illustration of the invention and are not intended as limitations thereof.

EXAMPLE 1

253 g of dichlorodiphenylsilane and 110 g of p-hydroquinone were dissolved in 500 ml of tetrahydrofuran and then reacted for 24 hours while refluxing at 100° C. After the completion of the reaction, the solvent was removed. The thus obtained phenoxydiphenylsiloxane polymer was a viscous solid and had the following structural formula:

Further, this polymer had a number average molecular weight of 3,000 as measured by VPO method.

The above polymer was added to SiC powder having a grain size of not more than 325 mesh in an amount of 10 parts by weight and then the resulting mixture was cold pressed under a pressure of 2,000 kg/cm$^2$ and heated in a nitrogen gas atmosphere up to 1,700° C. at a rising rate of 100° C./hr to obtain an SiC fired body. This fired body had a bulk density of 2.31 g/cm$^3$ and a flexural strength of 10.05 kg/mm$^2$. Further, the fired body exhibited an excellent oxidation resistance because the weight increase was only 4.5 mg/cm$^2$ when the body was heated at 1,400° C. in air for 70 hours.

EXAMPLE 2

The mixture of the phenoxydiphenylsiloxane polymer and SiC powder as described in Example 1 was cold pressed under a pressure of 200 kg/cm$^2$ and then exposed at room temperature to a radiation of 2,500,000 R using a γ-ray source of Co$^{60}$.

Next, the thus treated body was heated under the same conditions as described in Example 1 to obtain an SiC fired body. This fired body had a bulk density of 2.50 g/cm$^3$ and a flexural strength of 13.18 kg/mm$^2$ and exhibited only a weight increase of 3.3 mg/cm$^2$ when heating at 1,400° C. in air for 70 hours.

EXAMPLE 3

253 g of dichlorodiphenylsilane and 62 g of ethylene glycol were dissolved in 500 ml of n-butyl ether and then reacted for 24 hours under reflux at 100° C. After the completion of the reaction, the solvent and unreacted substance were distilled off under a reduced pressure of 20 mmHg at 200° C.

The thus obtained product was an oily organosilicon polymer and had a molecular weight of 2,300 as measured by VPO method.

This polymer was heated up to 600° C. in an argon gas atmosphere and pulverized and sieved to obtain powder having a grain size of not more than 325 mesh. 95 parts by weight of this powder was mixed with 5 parts by weight of the above polymer and then the resulting mixture was placed in an alumina die and thereafter hot pressed at 1,800° C. under a pressure of 700 kg/cm$^2$ by a high frequency heating using carbon as a heating element.

The thus obtained ceramic fired body consisted mainly of SiC and had a bulk density of 3.06 g/cm$^3$ and a flexural strength of 40 kg/mm$^2$. Further, this fired body exhibited an excellent oxidation resistance because the weight increase was only 1.2 mg/cm$^2$ when heating at 1,400° C. in air for 70 hours.

EXAMPLE 4

In an autoclave were charged 20 g (0.034 mole) of hexaphenylcyclotrisiloxane, 8.0 g (0.023 mole) of tetramethyl tetravinyl cyclotetrasiloxane and 40 mg of concentrated sulfuric acid and air in the autoclave was replaced with carbon dioxide gas and then the reaction was continued at 250° C. for 24 hours. Thereafter, benzene soluble matter was separated from the reaction product and then benzene was distilled off to obtain a light yellowish and viscous polymer. This polymer had a molecular weight of 3,640 as measured by VPO method.

The polymer was added to B$_4$C powder having a grain size of not more than 500 mesh in an amount of 12 parts by weight and then the resulting mixture was cold pressed under a pressure of 4,000 kg/cm$^2$ and heated up to 1,600° C. in a nitrogen gas atmosphere.

The thus obtained ceramic fired body had a bulk density of 2.08 g/cm$^3$ and a flexural strength of 7.8 kg/mm$^2$. This fired body itself was suitable for various applications as a neutron absorbing material. Moreover, the mechanical strength and non-permeability of the fired body could be improved by subjecting at least one time to a treatment consisting of an impregnation with the polymer and a heating. In this case, the mechanical strength was increased by about 4 kg/mm$^2$ every one impregnation treatment.

EXAMPLE 5

The polymer obtained in Example 4 was uniformly mixed with 5 parts by weight of azobisisobutyronitrile and the resulting mixture was added to B$_4$C powder (grain size of not more than 500 mesh) in an amount of 12 parts by weight. The mixture was cold pressed under a pressure of 4,000 kg/cm$^2$ and heated up to 1,600° C. in a nitrogen atmosphere to obtain a ceramic fired body. This fired body had a bulk density of 2.20 g/cm$^3$ and a flexural strength of 10 kg/mm$^2$.

EXAMPLE 6

In an autoclave (100 ml) were charged 59.4 g (0.1 mole) of hexaphenylcyclotrisiloxane, 5.93 g (0.02 mole) of octamethylcyclotetrasiloxane and 100 mg of concentrated sulfuric acid and after air in the autoclave was replaced with carbon dioxide gas, the reaction was continued at 250° C. for 24 hours. After the completion of the reaction, benzene soluble matter was separated and then benzene was distilled off to obtan a light yellowish and viscous polymer. This polymer had a molecular weight of 5,400 as measured by VPO method.

The polymer was added to Si$_3$N$_4$ powder having a grain size of not more than 325 mesh in an amount of 10 parts by weight and then the resulting mixture was cold pressed under a pressure of 2,000 kg/cm$^2$ and heated up to 1,700° C. in a nitrogen gas atmosphere to obtain a ceramic fired body. This fired body had a bulk density of 2.44 g/cm$^3$ and a flexural strength of 15 kg/mm$^2$.

EXAMPLE 7

253 g of dichlorodiphenylsilane and 184 g of glycerine were dissolved in 500 ml of n-butyl ether and then reacted at 100° C. in a nitrogen gas atmosphere under reflux for 24 hours. After the completion of the reaction, n-butyl ether was removed by means of an evaporator and then the residue was purified with benzene and acetone and dried at 80° C. over two nights to obtain a siloxane polymer.

This polymer was added to SiC powder having a grain size of not more than 325 mesh in an amount of 10 parts by weight and the resulting mixture was cold pressed under a pressure of 2,000 kg/cm$^2$ and then heated up to 1,700° C. at a rising rate of 100° C./hr in a nitrogen gas atmosphere to obtain an SiC fired body. This fired body has a bulk density of 2.29 g/cm$^3$ and a flexural strength of 9.90 kg/mm$^2$. Further, the fired body exhibited an excellent oxidation resistance because the weight increase was only 5.2 mg/cm$^2$ when heating at 1,400° C. in air for 70 hours.

EXAMPLE 8

253 g of dichlorodiphenylsilane and 228 g of bisphenol A were dissolved in 500 ml of n-butyl ether and then reacted at 100° C. in a nitrogen gas atmosphere under reflux for 24 hours. After the completion of the reaction, n-butyl ether was removed by means of an evaporator and the resulting precipitated polymer was separated, washed with n-butyl ether and dried at 80° C. over two nights to obtain a siloxane polymer.

This polymer was added to SiC powder having a grain size of not more than 325 mesh in an amount of 15 parts by weight and the resulting mixture was cold pressed under a pressure of 2,000 kg/cm$^2$ and then heated up to 1,600° C. at a rising rate of 100° C./hr in a nitrogen gas atmosphere to obtain an SiC fired body. This fired body had a bulk density of 2.70 g/cm$^3$ and a flexural strength of 14.14 kg/mm$^2$. Further, the fired body exhibited an excellent oxidation resistance because the weight increase was only 3.0 mg/cm$^2$ when heating at 1,400° C. in air for 70 hours.

EXAMPLE 9

The same organosilicon polymer as used in Example 3 was dissolved in tetrahydrofuran and heated up to 60° C. and then spherical hollowed graphites were dipped therein to coat the surface thereof with the polymer. The thus treated graphites were cold pressed into bricks and then fired up to 2,000° C. at a rising rate of 50° C./hr. The thus obtained graphite brick showed an oxidation loss of 2.8% on heating at 800° C. in air. On the contrary, the graphite brick prepared without using the organosilicon polymer showed an oxidation loss of 12% on heating under the same condition as described above.

EXAMPLE 10

The same organosilicon polymer as used in Example 1 was heated at 300° C. and then penetrated into carbon bricks under vacuum. Next, the thus treated carbon bricks were heated up to 800° C. at a rising rate of 400° C./hr in an argon gas atmosphere and again impregnated with the above polymer and then fired up to 1,900° C. in an argon gas atmosphere to prepare SiC-coated carbon bricks. This carbon brick showed an oxidation loss of 1.3% on heating at 800° C. in air for 1 hour, which was considerably smaller than the oxidation loss of 15% in the carbon brick prepared without using the above polymer. Further, the non-permeability of the brick were considerably improved.

What is claimed is:

1. A process for producing a thermalresistant ceramic fired body, which comprises adding an organosilicon polymer having the following structural formula:

wherein R$_1$ and R$_2$ are the same or different and represent an alkyl group having a carbon number of not more than 4, or a phenyl group, R$_4$ represents a hydrogen atom, a trimethylsilyl group, or a triphenylsilyl group, and n is less than 10,000, as an additive to at least one ceramic powder selected from the group consisting of oxides, carbides, nitrides, borides and silicides; molding the resulting mixture in a desired form; and then firing the molded body at a temperature of 800° to 2000° C. under vacuum or in at least one atmosphere selected from the group consisting of inert gas, carbon monoxide gas, carbon dioxide gas, nitrogen gas and hydrocarbon gas.

2. A process as claimed in claim 1, wherein said molded body is fired under a pressure of 2 to 2,000 kg/cm$^2$.

3. A process as claimed in claim 1, wherein said fired body is subjected at least one time to such a treatment that said fired body is impregnated with said organosilicon polymer and then heated at a temperature of 800° to 2,000° C. under vacuum or in at least one atmosphere selected from the group consisting of inert gas, carbon monoxide gas, carbon dioxide gas, hydrogen gas, nitrogen gas and hydrocarbon gas.

4. A process as claimed in claim 1, wherein said ceramic powder is one obtained by calcining said organosilicon polymer under vacuum or in at least one atmosphere selected from the group consisting of inert gas, carbon monoxide gas, carbon dioxide gas, hydrogen gas, nitrogen gas and hydrocarbon gas and then pulverizing it.

5. A process as claimed in claim 1, wherein R$_1$ and R$_2$ are each phenyl.

* * * * *